(12) United States Patent
Wu et al.

(10) Patent No.: US 11,922,465 B2
(45) Date of Patent: *Mar. 5, 2024

(54) EXPANDABLE CONTENT ITEMS FOR PRESENTING ADDITIONAL CONTENT

(71) Applicant: GOOGLE LLC, Mountain View, CA (US)

(72) Inventors: Amy Wu, Sunnyvale, CA (US); Brandon Murdock Pearcy, San Francisco, CA (US); Nathan Peter Lucash, San Francisco, CA (US); Jun Xu, Shanghai (CN); Yi Zhang, Sunnyvale, CA (US); Zhen Yu, Shanghai (CN)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/584,576

(22) Filed: Jan. 26, 2022

(65) Prior Publication Data
US 2022/0148044 A1 May 12, 2022

Related U.S. Application Data

(63) Continuation of application No. 16/735,268, filed on Jan. 6, 2020, now Pat. No. 11,263,671, which is a
(Continued)

(51) Int. Cl.
*G06Q 30/00* (2023.01)
*G06F 3/0482* (2013.01)
(Continued)

(52) U.S. Cl.
CPC ....... *G06Q 30/0277* (2013.01); *G06F 3/0482* (2013.01); *G06F 3/04842* (2013.01); *G06F 40/103* (2020.01); *G06T 3/40* (2013.01)

(58) Field of Classification Search
CPC .............. G06Q 30/0277; G06F 3/0482; G06F 3/04842; G06F 40/103; G06T 3/40
See application file for complete search history.

(56) References Cited

U.S. PATENT DOCUMENTS 7,356,477 B1   4/2008 Allan et al.
8,019,849 B1   9/2011 Lopilato
(Continued)

OTHER PUBLICATIONS

System, Method and Computer Program Product for Presenting an Advertisement Within Content An IP.com Prior Art Database Technical Disclosure, IP.com No. IPCOM000143565D IP.com Electronic Publication Date: Nov. 29, 2006 Authors et. al.: Disclosed Anonymously (Year: 2006).*

(Continued)

*Primary Examiner* — Sun M Li
(74) *Attorney, Agent, or Firm* — MARSHALL, GERSTEIN & BORUN LLP

(57) ABSTRACT

One or more servers can implement a method including generating an information resource comprising a content package including first content, metadata of a content extension, and a script for displaying the first content, and transmitting the information resource to a client device to cause the client device to: display the first content within an inline frame; identify an interaction with a user interface feature; transmit, responsive to identifying the interaction, a content extension request based on the metadata of the content extension; receive, responsive to the content extension request, a second content item; responsive to identifying the interaction, expand the inline frame from the first size to a second size; and display, in the expanded inline frame, the second content item, the second content item different from the first content item.

20 Claims, 5 Drawing Sheets

Related U.S. Application Data continuation of application No. 14/921,801, filed on Oct. 23, 2015, now Pat. No. 10,528,988, which is a continuation of application No. 13/669,036, filed on Nov. 5, 2012, now Pat. No. 9,177,334.

(60) Provisional application No. 61/555,418, filed on Nov. 3, 2011.

(51) Int. Cl.
*G06F 3/04842* (2022.01)
*G06F 40/103* (2020.01)
*G06Q 30/0241* (2023.01)
*G06T 3/40* (2006.01)

(56) References Cited

U.S. PATENT DOCUMENTS

| | | | |
|---|---|---|---|
| 9,177,334 B2 | 11/2015 | Wu et al. | |
| 9,443,257 B2 | 9/2016 | Dodda | |
| 10,140,633 B1* | 11/2018 | Jaye | G06Q 30/0277 |
| 10,528,988 B2 | 1/2020 | Wu et al. | |
| 2004/0239703 A1 | 12/2004 | Angelica | |
| 2005/0096979 A1* | 5/2005 | Koningstein | G06Q 30/0277 705/14.68 |
| 2006/0277477 A1 | 12/2006 | Christenson | |
| 2007/0050252 A1 | 3/2007 | Jain | |
| 2007/0245249 A1* | 10/2007 | Weisberg | G06F 9/451 709/204 |
| 2008/0183573 A1 | 7/2008 | Muschetto | |
| 2008/0195483 A1* | 8/2008 | Moore | G06F 16/958 705/14.69 |
| 2008/0221987 A1* | 9/2008 | Sundaresan | G06Q 30/0277 705/14.54 |
| 2009/0049412 A1 | 2/2009 | Lee et al. | |
| 2009/0327869 A1* | 12/2009 | Fan | G06Q 30/02 715/240 |
| 2010/0017289 A1 | 1/2010 | Sah | |
| 2010/0121681 A1 | 5/2010 | Abdulhayoglu et al. | |
| 2011/0047481 A1 | 2/2011 | Morgan | |
| 2011/0161990 A1* | 6/2011 | Smith | H04L 9/40 719/328 |
| 2011/0163969 A1 | 7/2011 | Anzures et al. | |
| 2012/0101907 A1 | 4/2012 | Dodda | |
| 2012/0191575 A1 | 7/2012 | Vilke | |
| 2013/0047123 A1 | 2/2013 | May et al. | |

OTHER PUBLICATIONS

T. Mei, X. Hua and S. Li, "VideoSense: A Contextual In-Video Advertising System," in IEEE Transactions on Circuits and Systems for Video Technology, vol. 19, No. 12, pp. 1866-1879, Dec. 2009, doi: 10.1109/TCSVT.2009.2026949 (Year: 2009).*
C. Olaverri-Monreal, C. Draxler and K.-J. Bengler, "Variable menus for the local adaptation of Graphical User Interfaces," 6th Iberian Conference on Information Systems and Technologies (CISTI 2011), Chaves, Portugal, 2011, pp. 1-6. (Year: 2011).*
Mei et al., "VideoSense: A Contextual In-Video Advertising System", IEEE Transactions on Circuits and Systems for Video Technology, vol. 19, No. 12, pp. 1866-1879 (Dec. 2009).
Final Office Action for U.S. Appl. No. 14/921,801 dated Jun. 26, 2018 (26 pages).
Final Office Action for U.S. Appl. No. 14/921,801 dated Jun. 7, 2019 (29 pages).
Non-Final Office Action for U.S. Appl. No. 14/921,801 dated Feb. 28, 2018 (29 pages).
Non-Final Office Action for U.S. Appl. No. 14/921,801 dated Jan. 8, 2019 (26 pages).
Notice of Allowance for U.S. Appl. No. 14/921,801 dated Aug. 29, 2019 (9 pages).
U.S. Office Action on U.S. Appl. No. 13/669,036, dated Feb. 24, 2015.
U.S. Office Action on U.S. Appl. No. 13/669,036, dated Jul. 17, 2014.
U.S. Notice of Allowance on U.S. Appl. No. 13/669,036, dated Jul. 1, 2015.
Final Office Action for U.S. Appl. No. 16/735,268 dated Jun. 28, 2021 (55 pages).

* cited by examiner

EXPANDABLE CONTENT ITEMS FOR PRESENTING ADDITIONAL CONTENT

CROSS-REFERENCE TO RELATED APPLICATIONS

This application claims priority to and is a continuation of U.S. application Ser. No. 16/735,268, filed on Jan. 6, 2020, which itself claims priority to and is a continuation of U.S. application Ser. No. 14/921,801, filed on Oct. 23, 2015, which itself claims priority to and is a continuation of U.S. application Ser. No. 13/669,036, filed on Nov. 5, 2012, which in turn claims priority to U.S. Provisional Application 61/555,418, filed on Nov. 3, 2011, all of which are incorporated herein by reference in their entirety.

FIELD OF THE INVENTION

This invention relates to Internet advertising.

BACKGROUND

Online advertisement service providers ("ad providers") provide Internet advertisements ("ads") to website pages. An advertiser places the ad with the ad provider.

A content network includes a plurality of website pages provided by publishers that provide content (e.g., text, audio, videos, articles, blogs, etc.) ("content pages") and allow advertisers to show ads along with the content of the content pages. A publisher publishes the content pages (e.g., by making the content pages available to users). Publishers may publish or produce news web sites, weather web sites, sports web sites, game web sites, guitar websites, and/or websites relating to other subjects. Additionally, the web sites can be informational, interactive, commercial, or other types of web sites. Content pages differ from search result pages, which are pages that solely serve to provide search responses to a user query.

BRIEF DESCRIPTION OF THE DRAWINGS

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION OF EMBODIMENTS

Typically, ads on content pages of a content network ("content ads") may be shown in an inline frame (e.g., an iframe) in the content pages. Due to the fixed space of the iframe, there may be insufficient space to render an ad extension including, for example, additional information related to the content ads. In some implementations, the additional information can be or include location information, product information, customer reviews, store hours, or other information related to the content ads or the advertiser. However, the implementation of an expandable application programming interface ("API") provides for expanding an iframe so that sufficient space can be made for rendering the ad extension.

When using a web browser, such as Google Chrome, Microsoft Internet Explorer, or Mozilla Firefox, a user requests a content page using known methods (e.g., by entering the destination of the content page into the web browser, clicking a link from a different content page or a search page, choosing a stored bookmark, etc.). As mentioned, content ads are ads that are rendered on content pages. An ad serving engine provides the content ad for rendering on the content pages.

Figure 1:
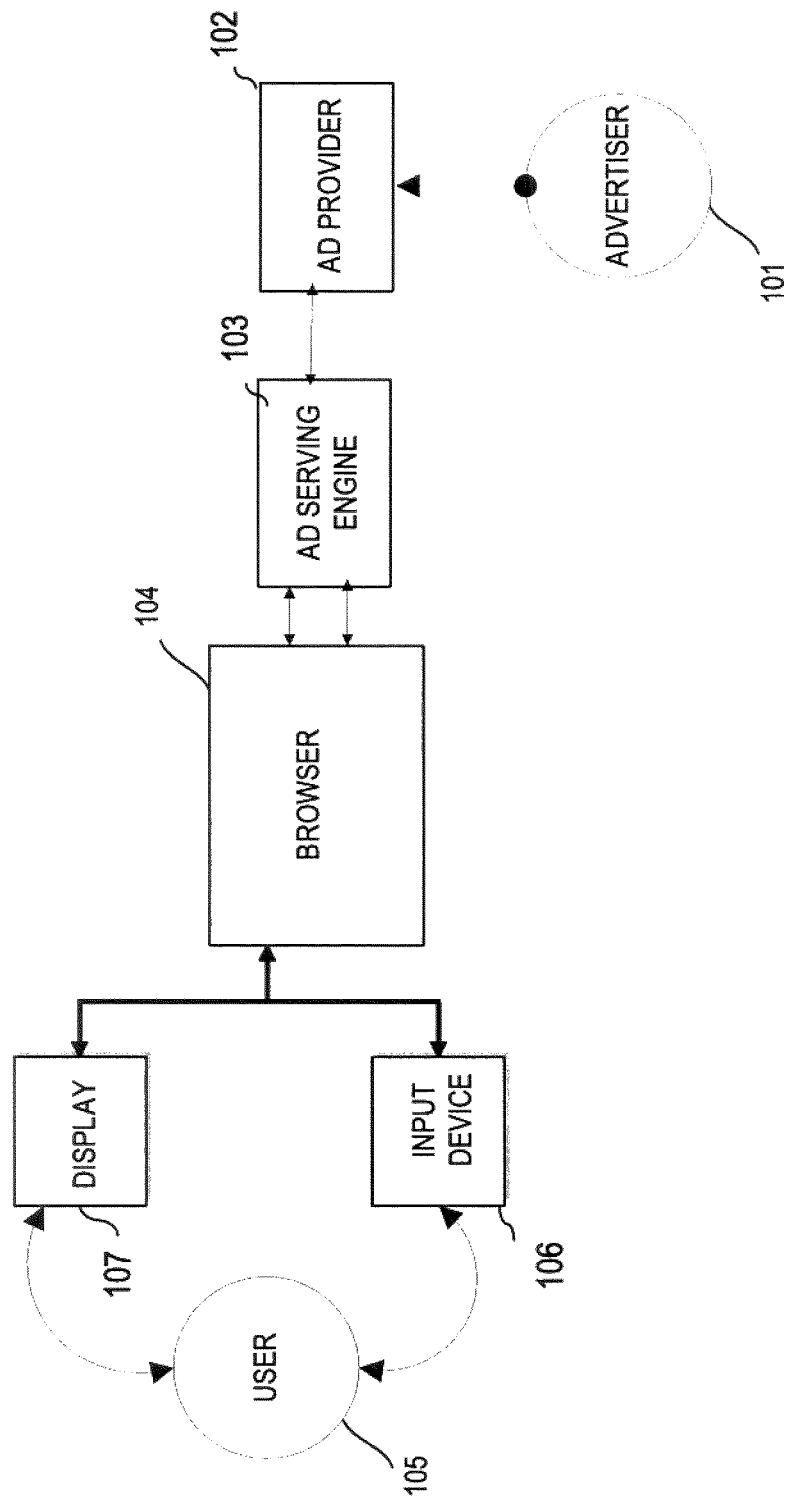
FIG. 1 is a block diagram of an example environment in which an advertisement management system provides advertising services in accordance with an illustrative embodiment.

Referring to FIG. 1, the Internet advertising process begins by an advertiser 101 providing a plurality of ad information to an ad provider 103. The ad provider processes the ad information in selecting advertisements to include in ad slots on content pages, including in video and/or audio content.

The process of providing content ad extensions ("ad extensions") begins by the advertiser 101 providing additional ad information to be used with a content ad ("ad extension information"). Alternatively, the ad providers could implement a process that generates the ad extension information for the content ads without additional input from the advertiser. Using either option, the ad provider then associates the ad extension information with a content ad and makes the data and the metadata for the content ad and associated ad extension information available to the ad serving engine 103. When requested, the ad serving engine transmits the data and the metadata for the content ad and the ad extension information to the web browser 104.

When the user 105 requests a content page using an input 106 to the web browser 104, the web browser 104 requests content ads to be shown on the content page from the ad serving engine 103. The ad serving engine 103 then makes a determination of which content ads will be returned and ultimately rendered on the content page using known methods. The ad serving engine 103 will return the content ads to the web browser 104 for rendering either directly or indirectly (e.g., through the content page provider) on a display 107. If any of the returned content ads have related ad extension information, the ad serving engine will also return the ad extension information in the form of an ad extension. The ad serving engine 103 collects the data and the metadata for the content ads determined to be returned and ultimately rendered on the content page, including any ad extension information, processes the data and the metadata for the content ad and the ad extension information into renderable content ads and ad extensions, and outputs the content ads and the ad extensions to the web browser 104 for rendering on the display 107.

On the content page, the ad serving engine returns the at least one content ad to the content page for rendering at least one content ad in an ad slot. The ad slot can be formed as an iframe of the content page. In an original view from the user's visual perspective, the content page is shown with the content of the content page and at least one ad slot containing at least one content ad. In the original view, the content ads and not the ad extensions for the content ads are shown in the ad slot of the iframe and are visible to the user. Each of the at least one content ads that are configured for an ad extension would also include a user interface to be used to activate the ad extension.

The user interface is a control mechanism providing the user the ability to view the ad extension. The user interface may be a clickable badge or icon beside the title of the content ad, for example. The user interface could be any different shape or icon, for example, an arrow, a circle, a map icon, a product icon, etc. A user could interact with the user interface in a variety of ways, including but not limited to a mouse-over, click, double-click, by hovering the cursor on the user interface for a predetermined period of time, etc. When the user interacts with the user interface, the user interface could then become a different color, could be shown as a different badge or icon, could no longer be shown, etc.

The ad extension could contain any additional information (e.g., maps, a product image list, a list of related products, information concerning a particular product, a particular product offered for sale, additional product offerings, a rating for a product, multiple products, a business, business location information, reviews on content such as a product or business, a phone number, other additional information as specified by the advertiser or generated by the ad provider, etc.). Ad extensions can be created in a variety of ad extension types (e.g., location extensions providing the location of a business, restaurant, or other place, product extensions providing related products or products offered for sale by a vendor, rating extensions providing the rating of a product or business, etc.). The ad extensions could include clickable content, including, but not limited to, links to products, links to other content pages, links to maps of the location of a business or other place, or other clickable content as specified by the advertiser. The destination of the clickable content could either be shown in the original browsing window or shown in a new browsing window. The format of the text in the ad extension can also be specified for all ad extensions or on a case-by-case basis for each ad extension.

When a user interacts with the user interface, the ad extension is displayed to the user. Upon user interaction, the web browser initiates an ad extension request for the ad extension to the ad serving engine, and upon receiving an ad extension response, containing the data and the metadata for the ad extension information associated with the content ad, the web browser causes the ad extension to be rendered and displayed. Alternatively, the ad serving engine provides the web browser with the data and the metadata for the content ad and the associated ad extension information when processing the initial request from the web browser, and upon user interaction, the web browser causes the ad extension to be rendered and displayed.

In causing the ad extension to be rendered and displayed, the browser interacts with an expandable API system. The expandable API system causes the iframe containing the ad slot and the at least one content ad to expand to a sufficient size to display the ad extension. When the iframe is expanded, the iframe contains the original ad slot, an expanded space adjacent to the ad slot, and a panel formed in the expanded space adjacent to the ad slot. The ad extension is located and displayed to the user in the panel. The content page would then be in an expanded view from the user's visual perspective with the content of the content page, the at least one ad slot, the expanded space, and the panel being visible to the user.

The panel could be formed in the entirety of the expanded space, or the panel could be formed in less than the entire expanded space, for example, in only the space adjacent to the content ad to which the ad extension corresponds. The ad extension could include, but is not limited to, phone numbers, product information, business location information, or other additional information as specified by the advertiser.

In an embodiment, the panel will be positioned in the expanded space as follows: (i) if the ad slot is a vertical ad slot (i.e., the vertical dimension is greater than a horizontal dimension of the ad slot and/or where the content ads are stacked on top of each other), the panel will be either on the left of the ad slot or on the right of the ad slot, depending on the expansion direction of the iframe containing the ad slot; (ii) if the ad slot is a horizontal ad slot (i.e., the horizontal dimension is greater than a vertical dimension of the ad slot and/or where the content ads are placed side-by-side), the panel will be either on the top of the ad slot or on the bottom of the ad slot, depending on the expansion direction of the iframe containing the ad slot.

If the ad slot contains multiple ads, the ad extension could be shown in the panel adjacent (in either a left, right, top, or bottom orientation, as appropriate) to the ad to which the ad extension corresponds. Further, the ad extension could be shown in the panel adjacent (in either a left, right, top, or bottom orientation, as appropriate) to the ad to which the ad extension corresponds, and a border could be shown around the ad extension and the ad to which the ad extension corresponds to indicate that the ad extension corresponds to the ad. Conversely or additionally, the ad extension could be shown in the panel adjacent (in either a left, right, top, or bottom orientation, as appropriate) to the ad to which the ad extension corresponds, and a background color, corresponding to the background of the content page or the background color of the ad slot, could be shown in the panel adjacent (in the same orientation as the ad extension) to all of the other ads in the ad slot to indicate that the ad extension does not correspond to the other ads in the ad slot.

Figure 2:
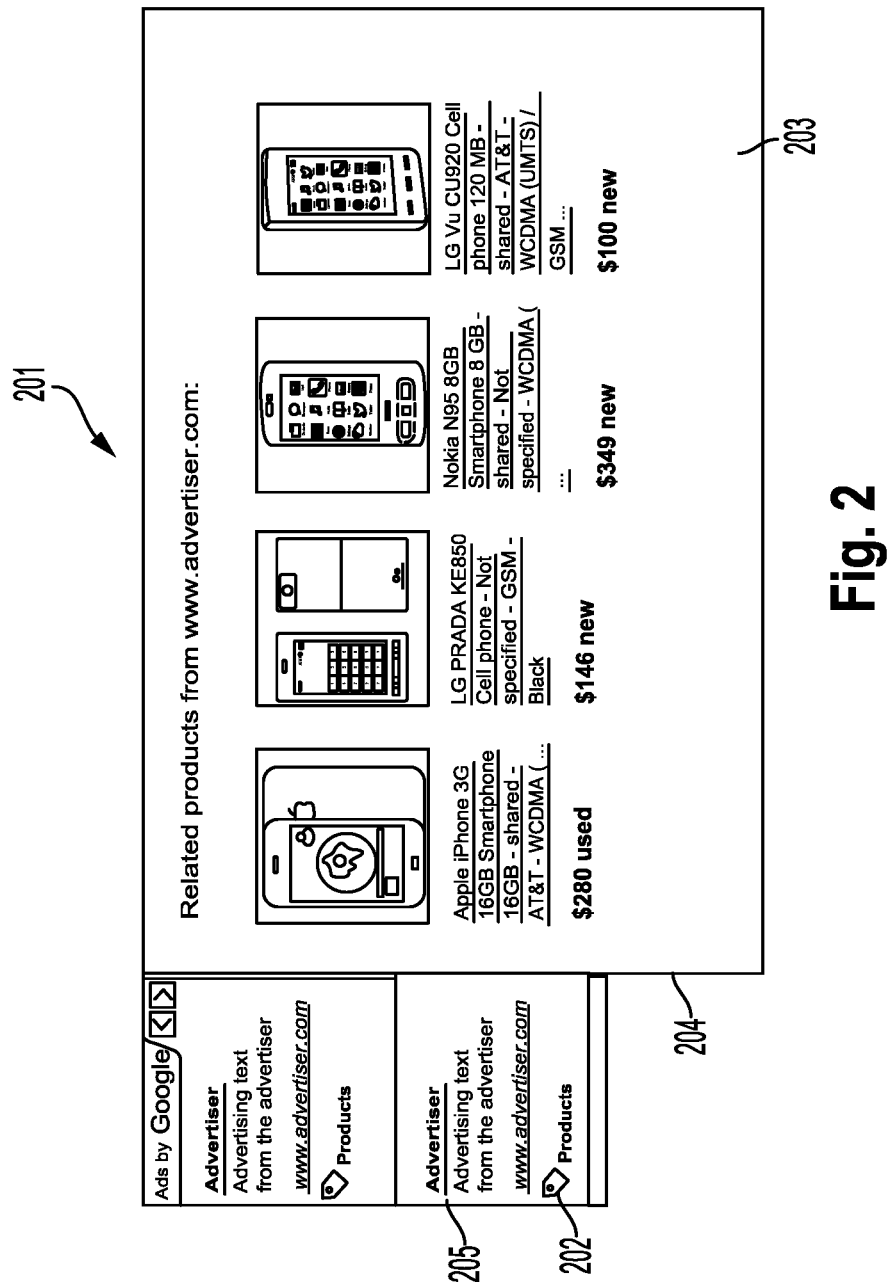
FIGS. 2 and 3 are screenshots of advertisements including ad extensions in accordance with illustrative embodiments.

FIG. 2 shows the iframe in an expanded state 201. An example of a user interface 202 is shown as a tag icon with text "Products" next to the tag icon, to indicate that the ad extension 203 contains product information. As an example, when the user interface 202 is clicked by the user, the ad extension 203 is displayed. The border 204, indicating that the ad extension 203 corresponds to a particular content ad 205 in the ad slot is also shown. In this illustrative example, the ad extension 203 contains additional products offered for sale by a retailer of the particular content ad 205.

Figure 3:
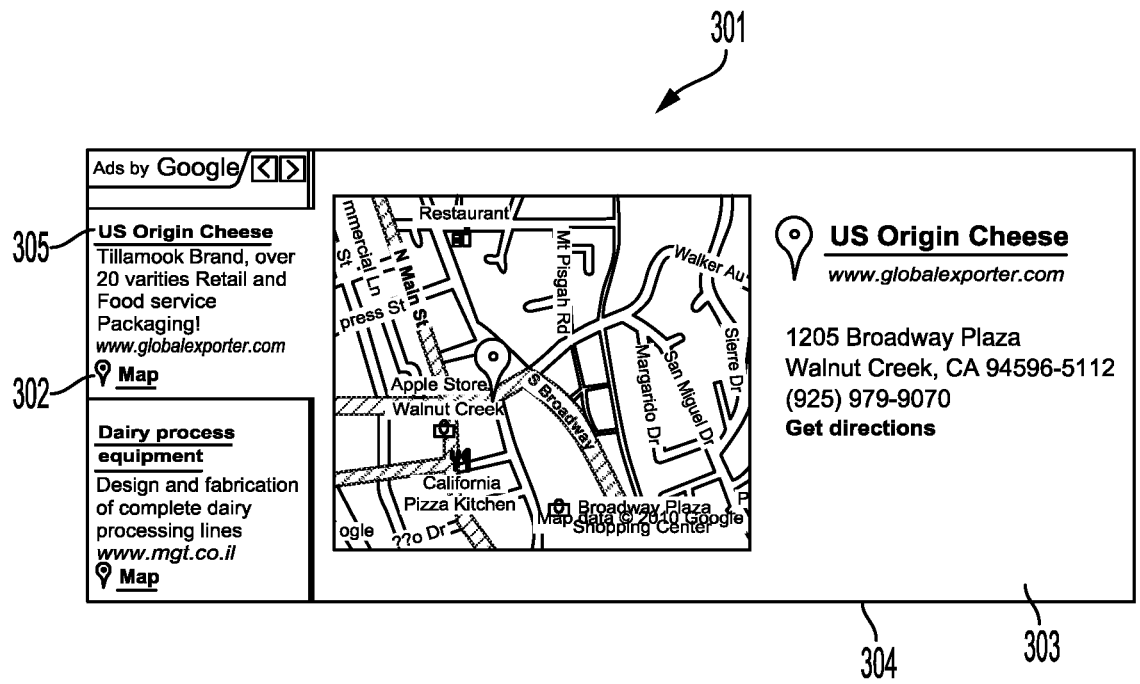

FIG. 3 shows the iframe in the expanded state 301. An example of a user interface 302 is shown as a balloon icon with text "Map" next to the balloon icon, to indicate that the ad extension 303 contains location information. As an example, when the user interface 302 is clicked by the user, the ad extension 303 is displayed. The border 304, again indicates that the ad extension 303 corresponds to a particular content ad 305 in the ad slot is also shown. In this illustrative example, the ad extension 303 contains location information about a business.

In an embodiment, if the ad slot is a vertical ad slot, or if the ad slot is horizontal slot and the ads in the ad slot float horizontally, the border will be implemented. Preferably, if the ad slot is a horizontal ad slot and the ads in the ad slot float vertically, the background color will be implemented.

When an iframe is expanded, forming an expanded space adjacent to an ad slot, and a panel adjacent to an ad is formed, the expanded space is a rectangle. The area of the panel would potentially be less than the rectangular area of the expanded space. This would cause the remainder of the expanded space to be unused space. The expanded space, including the panel containing the ad extension and the unused space, would potentially overlap a portion of the content on the content page and could potentially cover some clickable content on the content page, for example, links. This could potentially be confusing to a user because the user would be able to see the clickable content on the content page but would not be able to click the clickable content.

One solution to the possible confusion would be to set a background color to the unused space so that the clickable content would not be visible due to the background color. Another solution to the possible confusion would be to set a click handler for the unused space, where when a user clicks the unused space, the iframe would un-expand. When the iframe un-expands, the expanded space, including the panel containing the ad extension and the unused space, would no longer be shown, and the content page would return to the original view. Additional controls or effects may also cause the expanded iframe to un-expand and return to its original size.

In an embodiment, the content page is shown originally in a pre-expanded view. The ad extension would be originally visible to the user. The iframe would then be originally in an expanded state. Conversely, the content ad and the ad extension could be shown in the originally formatted, un-expanded iframe with the ad extension being displayed adjacent to the content ad. In this configuration, the content ad and the ad extension could either originally be shown smaller than they would be displayed if the iframe were expanded, or N-X content ads could be placed in the ad slot, where N is the typical amount of ads placed in the ad slot and X is the space provided for displaying one or more ad extensions. Alternatively, the iframe could be originally formatted to be a larger space, that would not need to be expanded to show the content ad and the ad extension. The ad extension would be embedded adjacent to the content ad by default, and no user interaction would be required. Alternatively, the ad extensions may be displayed without requiring user interaction with the user interface, wherein the expanded view is the original view or wherein the original view changes to the expanded view after a predetermined period of time, periodically, etc.

In an embodiment, ad extensions are served on a content network using a framework. The framework makes ad extension implementation easier. The framework will include: (1) a user-side framework to show the ad extension, such as a JavaScript framework, and (2) an advertiser-side rendering. The framework could take the form of templates that are built into the content pages. The ad serving engine could then have predefined templates for rendering the ad extensions into the user-side framework.

Figure 4:
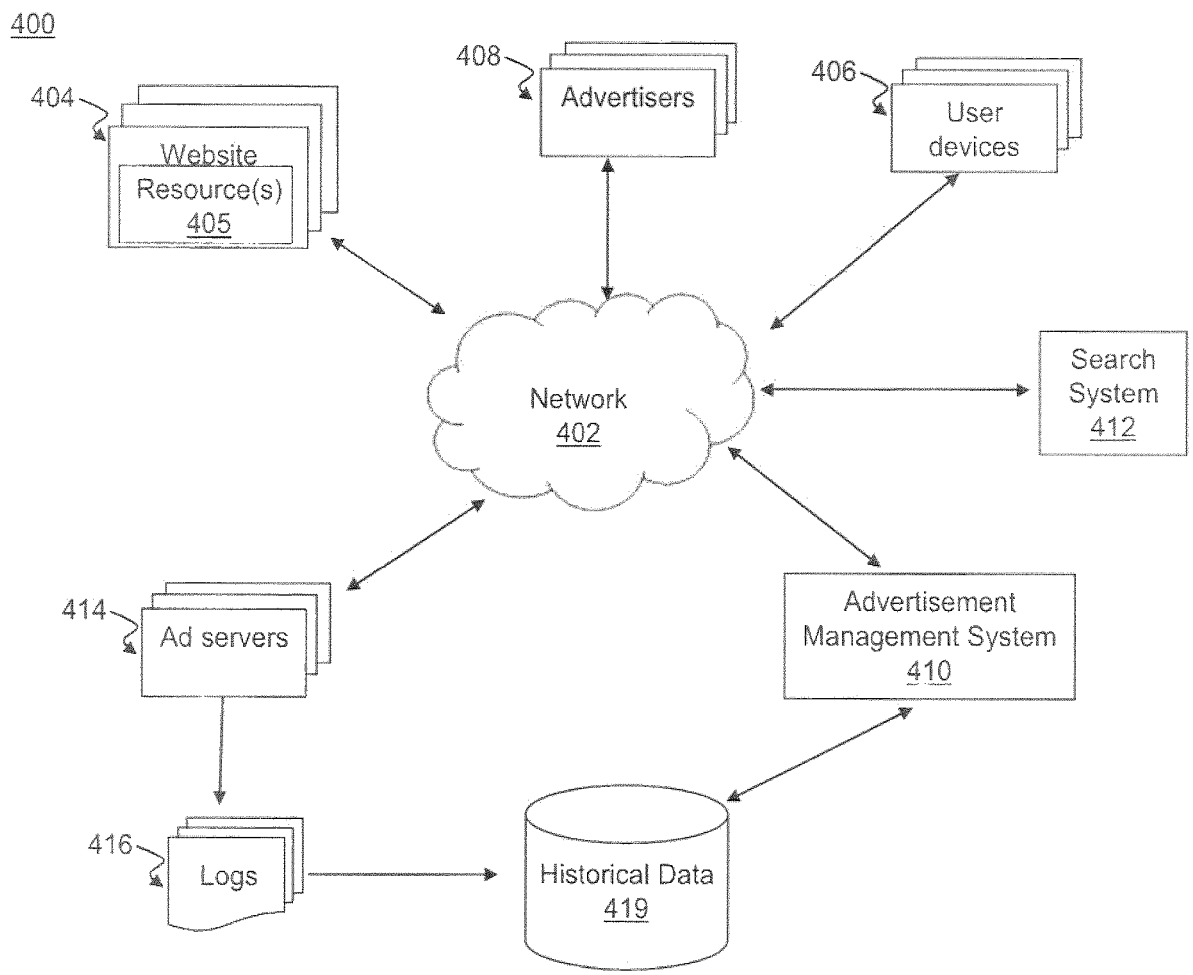
FIG. 4 is a block diagram of a network architecture used to provide advertising services in accordance with an illustrative embodiment.

FIG. 4 is a block diagram of an example environment in which an advertisement management system manages advertising services in accordance with an illustrative implementation. The example environment 400 includes a network 402, such as a local area network (LAN), a wide area network (WAN), the Internet, or a combination thereof. The network 402 connects websites 404, user devices 406, advertisers 408, and an advertisement management system 410. The example environment 400 may include many thousands of websites 404, user devices 406, and advertisers 408.

A website 404 includes one or more resources 405 associated with a domain name and hosted by one or more servers. An example website is a collection of web pages formatted in hypertext markup language (HTML) that can contain text, images, multimedia content, and programming elements, such as scripts. A specific example website is a website that contains calendar information for a particular user.

A resource 405 is any data that can be provided over the network 402. For example, user calendar and specific calendar events are examples of resources. A resource 405 can be identified by a resource address that is associated with the resource 405, such as a uniform resource locator (URL). Resources 405 can include web pages, word processing documents, portable document format (PDF) documents, images, video, programming elements, interactive content, and feed sources, to name only a few. The resources 405 can include content, such as words, phrases, images and sounds, that may include embedded information (such as meta-information in hyperlinks) and/or embedded instructions. Embedded instructions can include code that is executed at a user's device, such as in a web browser. Code can be written in languages such as JavaScript® or ECMAScript®.

A user device 406 is an electronic device that is under control of a user and is capable of requesting and receiving resources 405 over the network 402. Example user devices 406 include personal computers, mobile communication devices, and other devices that can send and receive data over the network 402. A user device 406 typically includes a user application, such as a web browser, to facilitate the sending and receiving of data over the network 402.

A user device 406 can request resources 405 from a website 404. In turn, data representing the resource 405 can be provided to the user device 406 for presentation by the user device 406. The data representing the resource 405 can include data specifying a portion of the resource or a portion of a user display (e.g., a presentation location of a pop-up window or in a slot of a web page) in which advertisements can be presented. These specified portions of the resource 405 or user display are referred to as advertisement slots.

To facilitate searching of the vast number of resources 405 accessible over the network 402, the environment 400 can include a search system 412 that identifies the resources 405 by crawling and indexing the resources 405 provided on the websites 404. Data about the resources 405 can be indexed based on the resource 405 with which the data is associated. The indexed and, optionally, cached copies of the resources 405 are stored in a search index (not shown).

User devices 406 can submit search queries to the search system 412 over the network 402. In response, the search system 412 accesses the search index to identify resources 405 that are relevant to the search query. In one illustrative implementation, a search query includes one or more keywords. The search system 412 identifies the resources 405 that are responsive to the query, provides information about the resources 405 in the form of search results and returns the search results to the user devices 406 in search results pages. A search result can include data generated by the search system 412 that identifies a resource 405 that is responsive to a particular search query, and can include a link to the resource 405. An example search result can include a web page title, a snippet of text or a portion of an image extracted from the web page 404, a rendering of the resource 405, and the URL of the web page 404. Search results pages can also include one or more advertisement slots in which advertisements can be presented.

A search result page or a content page can be sent with a request from the search system 412 for the web browser of the user device 406 to set an HTTP (HyperText Transfer Protocol) cookie. A cookie can represent, for example, a particular user device 406 and a particular web browser. For example, the search system 412 includes a server that replies to the query by sending the search results page in an HTTP response. This HTTP response includes instructions (e.g., a set cookie instruction) that cause the browser to store a cookie for the site hosted by the server or for the domain of the server. If the browser supports cookies and cookies are enabled, every subsequent web page request to the same server or a server within the domain of the server will include the cookie. The cookie can store a variety of data, including a unique or semi-unique identifier. The unique or semi-unique identifier can be anonymized and is not connected with user names. Because HTTP is a stateless protocol, the use of cookies allows an external service, such as the search system 412 or other system, store information over multiple sessions. A user may prevent such information storage, for example, by disabling cookies in the browser's settings.

When a resource 405 or search results are requested by a user device 406 or provided to the user device 406, the advertisement management system 410 receives a request for advertisements to be provided with the resource 405 or search results. The request for advertisements can include characteristics of the advertisement slots that are defined for the requested resource 405 or search results page, and can be provided to the advertisement management system 410. For example, a reference (e.g., URL) to the resource 405 for which the advertisement slot is defined, a size of the advertisement slot, and/or media types that are available for presentation in the advertisement slot can be provided to the advertisement management system 410. Similarly, keywords (i.e., one or more words that are associated with content) associated with a requested resource 405 ("resource keywords") or a search query for which search results are requested can also be provided to the advertisement management system 410 to facilitate identification of advertisements that are relevant to the resource 405 or search query. In addition, various other data such as, but not limited to, keywords generated from calendar entries can also be accessed by or provided to the advertisement management system 410.

Based on data included in the request for advertisements, the advertisement management system 410 can select advertisements that are eligible to be provided in response to the request ("eligible advertisements"). For example, eligible advertisements can include advertisements having characteristics matching the characteristics of advertisement slots and that are identified as relevant to specified user interests based upon a user's calendar entries. In some implementations, advertisements having targeting keywords that match a user's interests, the resource keywords, the search query, or portions of the search query are selected as eligible advertisements by the advertisement management system 410.

The advertisement management system 410 selects an eligible advertisement for each advertisement slot of a resource 405 or of a search results page. The resource 405 or search results page is received by the user device 406 for presentation by the user device 406. User interaction data representing user interactions with presented advertisements can be stored in a historical data store 419. For example, when an advertisement is presented to the user via an ad server 414, data can be stored in a log file 416. This log file 416, as more fully described below, can be aggregated with other data in the historical data store 419. Accordingly, the historical data store 419 contains data representing the advertisement impression. For example, the presentation of an advertisement is stored in response to a request for the advertisement that is presented. For example, the ad request can include data identifying a particular cookie, such that data identifying the cookie can be stored in association with data that identifies the advertisement(s) that were presented in response to the request. In some implementations, the data can be stored directly to the historical data store 419.

Similarly, when a user selects (i.e., clicks) a presented advertisement, data representing the selection of the advertisement can be stored in the log file 416, a cookie, or the historical data store 419. In some implementations, the data is stored in response to a request for a web page that is linked to by the advertisement. For example, the user selection of the advertisement can initiate a request for presentation of a web page that is provided by (or for) the advertiser. The request can include data identifying the particular cookie for the user device, and this data can be stored in the advertisement data store.

User interaction data can be associated with unique identifiers that represent a corresponding user device with which the user interactions were performed. For example, in some implementations, user interaction data can be associated with one or more cookies. Each cookie can include content which specifies an initialization time that indicates a time at which the cookie was initially set on the particular user device 406.

The log files 416, or the historical data store 419, also store references to advertisements and data representing conditions under which each advertisement was selected for presentation to a user. For example, the historical data store 419 can store targeting keywords, bids, and other criteria with which eligible advertisements are selected for presentation. Additionally, the historical data store 419 can include data that specifies a number of impressions for each advertisement and the number of impressions for each advertisement can be tracked, for example, using the keywords that caused the advertisement impressions and/or the cookies that are associated with the impressions. Data for each impression can also be stored so that each impression and user selection can be associated with (i.e., stored with references to and/or indexed according to) the advertisement that was selected and/or the targeting keyword that caused the advertisement to be selected for presentation.

Figure 5:
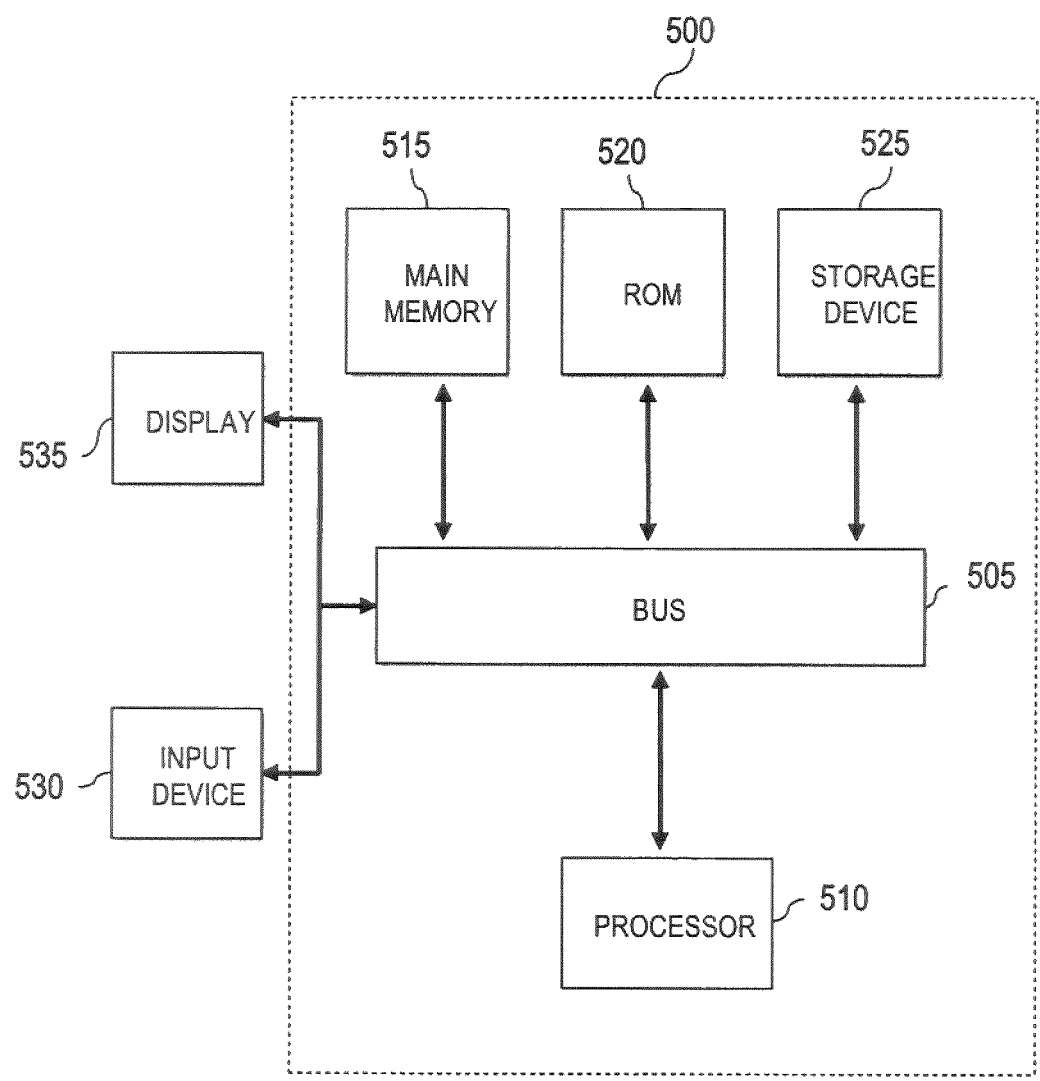
FIG. 5 is a block diagram of a computer system in accordance with an illustrative embodiment.

FIG. 5 is a block diagram of a computer system in accordance with an illustrative implementation. The computer system or computing device 500 can be used to implement a device that can implement method 300, a user device 406, etc. The computing system 500 includes a bus 505 or other communication component for communicating information and a processor 510 coupled to the bus 505 for processing information. The computing system 500 also includes main memory 515, such as a random access memory (RAM) or other dynamic storage device, coupled to the bus 505 for storing information, and instructions to be executed by the processor 510. Main memory 515 can also be used for storing position information, temporary variables, or other intermediate information during execution of instructions by the processor 510. The computing system 500 may further include a read only memory (ROM) 510 or other static storage device coupled to the bus 505 for storing static information and instructions for the processor 510. A storage device 525, such as a solid state device, magnetic disk or optical disk, is coupled to the bus 505 for persistently storing information and instructions.

The computing system 500 may be coupled via the bus 505 to a display 535, such as a liquid crystal display, or active matrix display, for displaying information to a user. An input device 530, such as a keyboard including alphanumeric and other keys, may be coupled to the bus 505 for communicating information and command selections to the processor 510. In another implementation, the input device 530 has a touch screen display 535. The input device 530 can include a cursor control, such as a mouse, a trackball, or cursor direction keys, for communicating direction information and command selections to the processor 510 and for controlling cursor movement on the display 535.

According to various implementations, the processes described herein can be implemented by the computing system 500 in response to the processor 510 executing an arrangement of instructions contained in main memory 515. Such instructions can be read into main memory 515 from another computer-readable medium, such as the storage device 525. Execution of the arrangement of instructions contained in main memory 515 causes the computing system 500 to perform the illustrative processes described herein. One or more processors in a multi-processing arrangement may also be employed to execute the instructions contained in main memory 515. In alternative implementations, hard-wired circuitry may be used in place of or in combination with software instructions to implement illustrative implementations. Thus, implementations are not limited to any specific combination of hardware circuitry and software.

Although an example computing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

The operations described in this specification can be implemented as operations performed by a data processing apparatus on data stored on one or more computer-readable storage devices or received from other sources.

The term "data processing apparatus" or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

While the above description contains many specifics, these specifics should not be construed as limitations on the scope of the invention, but merely as exemplifications of the disclosed embodiments. Those skilled in the art will envision many other possible variations that are within the scope of the invention as defined by the claims appended hereto.

What is claimed is:

1. A system comprising:
one or more servers configured to:
maintain an association between a first content item and one or more services from a plurality of services;
receive, from a client device including one or more processors, via a network, a request to provide content for display;
generate an information resource comprising a content package including the first content item, metadata of a content extension associated with the one or more services and the first content item, a user interface feature, and a script for displaying the first content item within the information resource;
transmit, to the client device over the network responsive to the request for content, the information resource, the script including computer-executable instructions configured to cause the client device to:
display the first content item and the user interface feature within a first region of an inline frame of the information resource, the inline frame having a first size;
identify an interaction with the user interface feature displayed in the first region;
transmit, responsive to identifying the interaction, a content extension request based on the metadata of the content extension included in the content package;
receive, responsive to the content extension request, a second content item associated with the one or more services;
responsive to identifying the interaction, expand the inline frame from the first size to a second size; and
display, in the expanded inline frame, the second content item based on the metadata of the content extension, the second content item different from the first content item.

2. The system of claim 1, wherein the one or more processors are configured to receive the request for content by receiving the request for a plurality of search results comprising one or more keywords, the first content item selected based on the one or more keywords.

3. The system of claim 1, wherein the one or more processors are further configured to:
display, with the second content item, a second user interface feature; and
responsive to identifying a second interaction with the second user interface feature, un-expand the inline frame from the second size to the first size.

4. The system of claim 1, wherein the one or more processors are further configured to generate, responsive to the request for content, the content package.

5. The system of claim 1, wherein the one or more processors are configured to expand the inline frame by expanding the inline frame while displaying the first content item in the first region.

6. The system of claim 1, wherein the one or more processors are further configured to:
maintain a second association between a third content item and one or more second services of the plurality of services;
receive, from the client device, a second request for content for display on the information resource;
transmit, to the client device over the network responsive to the second request for content, a second content package including the third content item, a fourth content item based on the one or more second services having the association with the third content item, a second user interface feature and a second script for displaying the third content item and the fourth content item within the information resource, the second script including computer-executable instructions configured to cause the client device to:
display the third content item and the second user interface feature within the expanded inline frame;
identify a second interaction with the second user interface feature to cause the client device to display the fourth content item included in the content package; and
display, in the expanded inline frame, the fourth content item.

7. A non-transitory computer-readable medium storing instructions that, when executed by one or more processors, cause the one or more processors to perform operations comprising:

maintaining an association between a first content item and one or more services from a plurality of services;
receiving, via a network, from a client device including one or more data processors, a request to provide content for display;
generating an information resource comprising a content package including the first content item, metadata of a content extension associated with the one or more services and the first content item, a user interface feature, and a script for displaying the first content item within the information resource;
transmitting, to the client device over the network responsive to the request content, the information resource, the script including computer-executable instructions configured to cause the client device to:
display the first content item and the user interface feature within a first region of an inline frame of the information resource, the first region having a first size;
identify an interaction with the user interface feature displayed in the first region;
transmit, responsive to identifying the interaction, a content extension request based on the metadata of the content extension included in the content package;
receive, responsive to the content extension request, a second content item associated with the one or more services;
responsive to identifying the interaction, expand the inline frame from the first size to a second size; and
display, in the expanded inline frame, the second content item based on the metadata of the content extension, the second content item different from the first content item.

8. The non-transitory computer-readable medium of claim 7, wherein receiving the request for content includes receiving the request for a plurality of search results comprising one or more keywords, the first content item selected based on the one or more keywords.

9. The non-transitory computer-readable medium of claim 7, wherein the operations further comprise:
displaying, with the second content item, a second user interface feature; and
responsive to identifying a second interaction with the second user interface feature, un-expanding the inline frame from the second size to the first size.

10. The non-transitory computer-readable medium of claim 7, wherein the operations further comprise generating, responsive to the request for content received from the client device, the content package.

11. The non-transitory computer-readable medium of claim 7, wherein expanding the inline frame includes expanding the inline frame while displaying the first content item in the first region.

12. The non-transitory computer-readable medium of claim 7, the operations further comprising:
maintaining a second association between a third content item and one or more second services of the plurality of services;
receiving, via the network, from the client device, a second request for content for display;
transmitting, to the client device over the network responsive to the second request for content, a second content package including the third content item, a fourth content item based on the one or more second services having the association with the third content item, a second user interface feature and a second script for displaying the third content item and the fourth content item within the information resource, the second script including computer-executable instructions configured to cause the client device to:
display the third content item and the second user interface feature within the expanded inline frame;
identify an interaction with the second user interface feature to cause the client device to display the fourth content item included in the content package; and
display, in the expanded inline frame, the fourth content item.

13. The non-transitory computer-readable medium of claim 7, wherein expanding the inline frame includes expanding the inline frame in an expansion direction based on a ratio between a horizontal dimension and a vertical dimension of the inline frame prior to expanding the inline frame.

14. A method, comprising:
maintaining, by one or more processors coupled to memory, an association between a first content item and one or more services from a plurality of services;
receiving, by the one or more processors, via a network, from a client device including one or more data processors, a request to provide content for display;
generating, by the one or more processors, an information resource comprising a content package including the first content item, metadata of a content extension associated with the one or more services and the first content item, a user interface feature, and a script for displaying the first content item within the information resource;
transmitting, to the client device over the network responsive to the request for content, the information resource, the script including computer-executable instructions configured to cause the client device to:
display the first content item and the user interface feature within a first region of an inline frame of the information resource, the first region having a first size;
identify an interaction with the user interface feature displayed in the first region;
transmit, responsive to identifying the interaction, a content extension request based on the metadata of the content extension included in the content package;
receive, responsive to the content extension request, a second content item associated with the one or more services;
responsive to identifying the interaction, expand the inline frame from the first size to a second size; and
display, in the expanded inline frame, the second content item based on the metadata of the content extension, the second content item different from the first content item.

15. The method of claim 14, wherein receiving the request for content includes receiving the request for a plurality of search results comprising one or more keywords, the first content item selected based on the one or more keywords.

16. The method of claim 14, further comprising:
displaying, with the second content item, a second user interface feature; and
responsive to identifying a second interaction with the second user interface feature, un-expanding the inline frame from the second size to the first size.

17. The method of claim 14, further comprising:
generating, responsive to the request for content, the content package.

18. The method of claim 14, wherein expanding the inline frame includes expanding the inline frame while displaying the first content item in the first region.

19. The method of claim 14, further comprising:
maintaining a second association between a third content item and one or more second services of the plurality of services;
receiving, via the network, from the client device, a second request for content for display;
transmitting, to the client device over the network responsive to the second request for content, a second content package including the third content item, a fourth content item based on the one or more second services having the association with the third content item, a second user interface feature and a second script for displaying the third content item and the fourth content item within the information resource, the second script including computer-executable instructions configured to cause the client device to:
display the third content item and the second user interface feature within the expanded inline frame;
identify an interaction with the second user interface feature to cause the client device to display the fourth content item included in the content package; and
display, in the expanded inline frame, the fourth content item.

20. The method of claim 14, wherein expanding the inline frame includes expanding the inline frame in an expansion direction based on a ratio between a horizontal dimension and a vertical dimension of the inline frame prior to expanding the inline frame.

* * * * *